United States Patent
Pramanik et al.

(10) Patent No.: US 9,930,036 B2
(45) Date of Patent: Mar. 27, 2018

(54) SYSTEM AND METHOD FOR PROVIDING LOCATION BASED SECURITY CONTROLS ON MOBILE DEVICES

(71) Applicant: SysTools Software Private Limited, Pune (IN)

(72) Inventors: Debasish Pramanik, Pune (IN); Anurag Singh, Pune (IN); Jude Aloysius, Pune (IN); Haseena Shaikh, Pune (IN)

( * ) Notice: Subject to any disclaimer, the term of this patent is extended or adjusted under 35 U.S.C. 154(b) by 149 days.

(21) Appl. No.: 15/009,720

(22) Filed: Jan. 28, 2016

(65) Prior Publication Data

US 2017/0093919 A1 Mar. 30, 2017

(30) Foreign Application Priority Data

Sep. 29, 2015 (IN) .......................... 3705/MUM/2015

(51) Int. Cl.
*H04L 29/06* (2006.01)
*G06F 21/30* (2013.01)
(Continued)

(52) U.S. Cl.
CPC ........ *H04L 63/0861* (2013.01); *G06F 21/305* (2013.01); *G06F 21/32* (2013.01);
(Continued)

(58) Field of Classification Search
CPC ........ G06F 21/32; G06F 21/305; G06F 21/35; H04W 12/06; H04W 12/08; H04L 63/0861; H04L 63/101; H04L 63/107; H04L 63/20
See application file for complete search history.

(56) References Cited

U.S. PATENT DOCUMENTS 9,332,392 B1 * 5/2016 Conway ................ H04W 4/025
2006/0133338 A1 * 6/2006 Reznik ................ H04L 27/3477
370/338

(Continued)

OTHER PUBLICATIONS

Bertino, Elisa, and Michael S. Kirkpatrick. "Location-based access control systems for mobile users: concepts and research directions." Proceedings of the 4th ACM SIGSPATIAL International Workshop on Security and Privacy in GIS and LBS. ACM, 2011. (pp. 49-52).*

(Continued)

*Primary Examiner* — Kari Schmidt
(74) *Attorney, Agent, or Firm* — The Law Office of Austin Bonderer, PC; Austin Bonderer

(57) ABSTRACT

A computer implemented method for providing location based security controls on a plurality of user devices is provided. The method includes the following steps of: (a) defining a geo location of an area at a server, (b) defining a radius of said area where security policies are effective at the server, (c) retrieving a current location of one or more of users, (d) activating the security policies on the one or more users devices when the one or more users enter within the radius of the area, (e) restricting blacklisted applications and websites to be accessed on the one or more user devices, (f) accessing a camera of the one or more user devices to control the camera, (g) retrieving biometric information of the one or more users, and (h) tracking an attendance of the one or more users based on the biometric information of the one or more users.

12 Claims, 6 Drawing Sheets

(51) Int. Cl.
*G06F 21/32* (2013.01)
*G06F 21/35* (2013.01)
*H04W 12/06* (2009.01)
*H04W 12/08* (2009.01)
*H04W 4/02* (2018.01)

(52) U.S. Cl.
CPC ............ *G06F 21/35* (2013.01); *H04L 63/101* (2013.01); *H04L 63/20* (2013.01); *H04W 12/06* (2013.01); *H04W 12/08* (2013.01); *H04L 63/107* (2013.01); *H04W 4/021* (2013.01)

(56) References Cited

U.S. PATENT DOCUMENTS

| | | | | |
|---|---|---|---|---|
| 2013/0005294 A1* | 1/2013 | Levinson | ................. | H04N 7/18 455/404.2 |
| 2014/0280934 A1* | 9/2014 | Reagan | ................... | H04L 47/70 709/225 |
| 2014/0331272 A1* | 11/2014 | Gupta | ...................... | H04L 63/20 726/1 |
| 2015/0050922 A1* | 2/2015 | Ramalingam | ......... | H04W 12/08 455/418 |
| 2015/0087303 A1* | 3/2015 | Hillary | .................. | H04W 4/021 455/435.1 |
| 2015/0312467 A1* | 10/2015 | Lee | ....................... | H04W 68/00 348/211.2 |
| 2015/0339461 A1* | 11/2015 | Min | ........................ | G06F 21/10 726/28 |
| 2015/0341484 A1* | 11/2015 | Yablokov | .......... | H04M 1/72577 455/410 |
| 2016/0094560 A1* | 3/2016 | Stuntebeck | ........... | H04L 63/102 726/1 |
| 2016/0284146 A1* | 9/2016 | Moore | .............. | G06F 17/30312 |

OTHER PUBLICATIONS

B. Ben Chirchir, X. Zhang, M. Li, Q. Qian, N. Ruan and H. Zhu, "SmartSec: Secret sharing-based location-aware privacy enhancement in smart devices," 2015 IEEE/CIC International Conference on Communications in China (ICCC), Shenzhen, 2015, pp. 1-6.*

* cited by examiner

SYSTEM AND METHOD FOR PROVIDING LOCATION BASED SECURITY CONTROLS ON MOBILE DEVICES

CROSS-REFERENCE TO RELATED APPLICATIONS

This application claims priority to Indian patent application no. 3705/MUM/2015 filed on Sep. 29, 2015, the complete disclosure of which, in its entirely, is herein incorporated by reference.

BACKGROUND

Technical Field

The embodiments herein generally relate to enterprise security, and more particularly, to a system and method for providing location based security controls on mobile devices within a defined area (e.g., office premises).

Description of the Related Art

The proliferation of mobile devices has allowed users to be accessible for communication while actively moving about, in office premises, around campuses and even across large geographic areas. Common examples of mobile devices include mobile telephone stations or smart phones as well as various portable computer devices having wireless connectivity (e.g. netbooks or laptops). With the advent of IT consumerization, businesses are unable to prevent employees from bringing personal portable mobile devices to the workplace. Likewise, it is also difficult for educational institutions to prohibit the use of personal devices in their premises.

The devices used by employees may be used for accessing applications or websites that are unrelated to their work (e.g., social media, games), which may hinder their productivity at the workplace. Further some application or websites (e.g., personal email) can also be used for data leakage, in case an employee wants to steal or misuse confidential or proprietary information. To avoid such instances, typically enterprises or institutions may come up with a security policy. For example, an enterprise may have a guideline under which its personnel may be prohibited from using certain applications from the devices inside the premises. However, there is no way to enforce this, particularly on mobile devices such as tablet computers, laptops, and smartphones. Accordingly, there remains a need for providing location based security controls on mobile devices.

SUMMARY

In view of a foregoing, a computer implemented method for providing location based security controls on one or more user devices is provided. The method includes the following steps of: (a) defining a geo location of an area at a server, (b) defining a radius of the area where security policies are effective at the server, (c) retrieving a current location of one or more users, (d) activating the security policies on the one or more users devices when the one or more users enter within the radius of the area from an outside of a boundary, (e) restricting blacklisted applications and websites or not white listed applications to be accessed on the one or more user devices upon the one or more users enter into the radius of the area, (f) accessing a camera of the one or more user devices to control the camera from the server, (g) retrieving biometric information of the one or more users, and (h) tracking an attendance of the one or more users when the one or more users enter within the radius of the area based on the biometric information of the one or more users.

In one embodiment, the method further includes the step of accessing the camera of the one or more user devices from the server based on an image processing unit that authorizes picture taken based on a type of object that the camera points at.

In another embodiment, the one or more user devices may be a computer, a mobile phone, a tablet, a music player, and/or a smartphone.

In yet another embodiment, the method further includes the step of defining the white listed of allowable applications and websites at the server for the one or more users to access.

In yet another embodiment, the method further includes the step of defining the blacklisted applications and websites at the server which are restricted for access by the one or more users.

In yet another embodiment, the method further includes the step of applying the security policies on the one or more user devices.

In yet another embodiment, the biometric information is popped up to ensure one or more user devices that are being used only by authorized the one or more users.

In one aspect, a non-transitory program storage device readable by a computer, and including a program of instructions executable by the computer to perform a method for providing location based security controls on one or more user devices is provided. The method includes the following steps of: (a) defining a geo location of an area at a server, (b) defining a radius of the area where security policies are effective at the server, (c) retrieving a current location of one or more users, (d) activating the security policies on the one or more users devices when the one or more users enter within the radius of the area from an outside of a boundary, (e) restricting blacklisted applications and websites or not white listed applications to be accessed on the one or more user devices upon the one or more users enter into the radius of the area, (f) accessing a camera of the one or more user devices to control the camera from the server, (g) retrieving biometric information of the one or more users, and (h) tracking an attendance of the one or more users when the one or more users enter within the radius of the area based on the biometric information of the one or more users.

In one embodiment, the one or more user devices may be a computer, a mobile phone, a tablet, a music player, and/or a smartphone.

In another embodiment, the method further includes the step of accessing the camera of the one or more user devices from the server based on an image processing unit that authorizes picture taken based on a type of object that the camera points at.

In yet another embodiment, the method further includes the step of defining the white listed of allowable applications and websites at the server for the one or more users to access.

In yet another embodiment, the method further includes the step of defining the blacklisted applications and websites at the server which are restricted for access by the one or more users.

In yet another embodiment, the method further includes the step of applying the security policies on the one or more user devices.

In yet another embodiment, the biometric information is popped up to ensure one or more user devices that are being used only by authorized the one or more users.

In another aspect, a system for providing location based security controls on one or more user devices is provided. The system includes a memory unit, and a processor. The memory unit that stores a database and a set of modules. The processor that executes the set of modules. The set of modules include (a) a location retrieval module, (b) a security policy activation module, (c) an access restriction module, (d) a camera access module, (e) a biometric information retrieval module, and (f) an attendance module. The location retrieval module is configured to retrieve a current location of one or more users. The security policy activation module is configured to activate security policies on the one or more users devices when the one or more users enter within a radius of an area from an outside of a boundary. The outside of the boundary is an outer area of the radius of the area. The radius of the area is defined at a server. The access restriction module is configured to restrict blacklisted applications and websites and/or not white listed applications to be accessed on the one or more user devices upon the one or more users enter into the radius of the area. The camera access module is configured to access a camera of the one or more user devices to control the camera from the server. The biometric information retrieval module is configured to retrieve biometric information of the one or more users. The biometric information is popped up to ensure the one or more user devices are being used only by authorized the one or more users. The attendance module is configured to track an attendance of the one or more users when the one or more users enter within the radius of the area based on the biometric information of the one or more users.

In one embodiment, the one or more user devices may be a computer, a mobile phone, a tablet, a music player, and/or a smartphone.

In another embodiment, the camera of the one or more user devices are accessed from the server based on an image processing unit that authorizes picture taken based on a type of object that the camera points at.

In yet another embodiment, the system further includes an application defining module that includes (a) a white listed application defining module, and (b) a blacklisted application defining module. The white listed application defining module is configured to allow an administrator to define the white listed applications and websites at the server. The blacklisted application defining module is configured to allow the administrator to define the blacklisted applications and websites at the server to restrict accessing by the one or more users.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
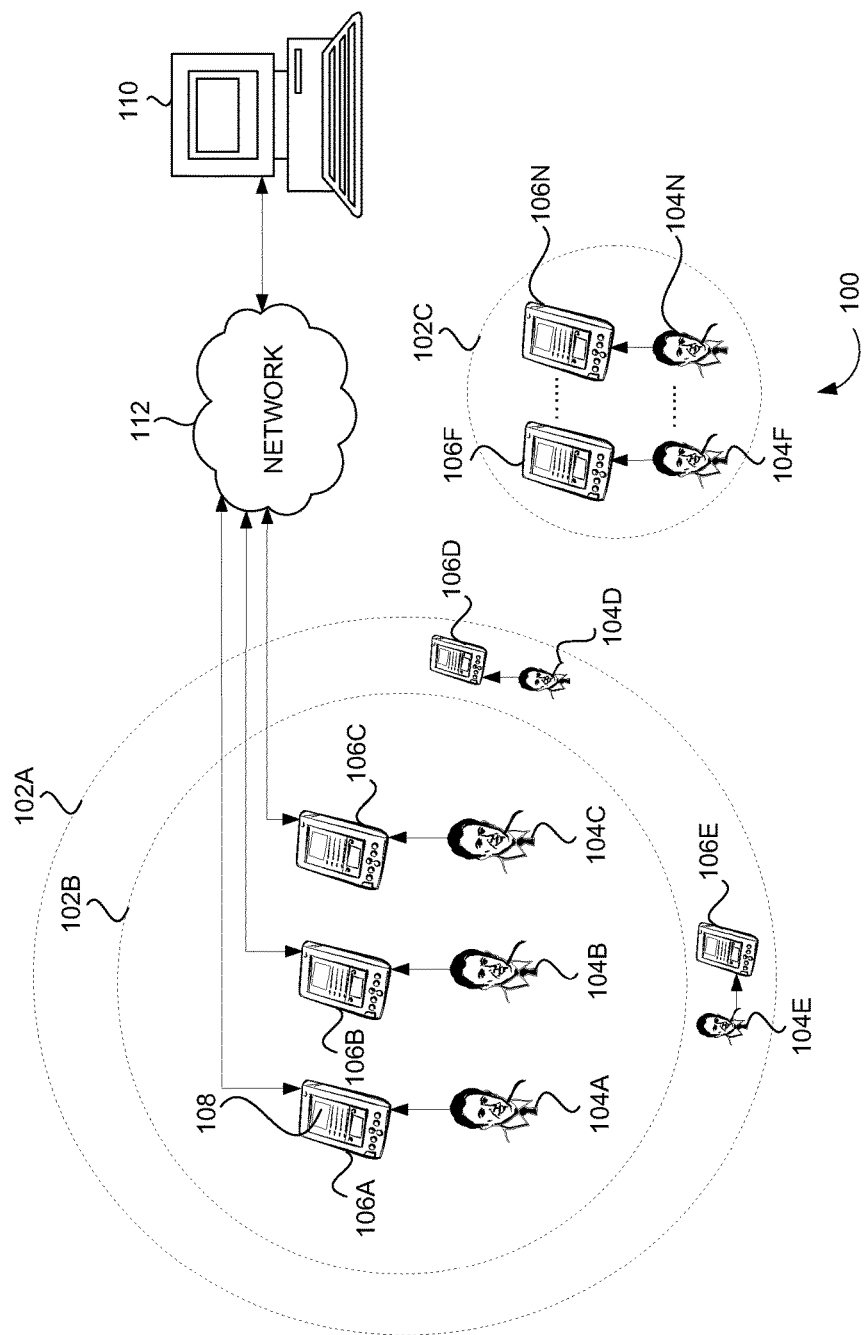
FIG. 1 illustrates a system view of one or more users carrying one or more user devices that have a security control tool that applies location based security controls within an area according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for providing location based security controls on mobile devices. The embodiments herein achieve this by using a security control tool to provide the security for the area (e.g. area of an enterprise) that is defined by security policies. The security policies are applied when one or more users enter into the area (e.g. the enterprise). The users are restricted from accessing blacklisted applications and/or websites inside the area. Further, an attendance of the one or more users may be tracked using the security control tool based on biometric information of the one or more users. Further, a camera of the device may be controlled. Referring now to the drawings, and more particularly to FIGS. 1 through 5, where similar reference characters denote corresponding features consistently throughout the figures, there are shown preferred embodiments.

FIG. 1 illustrates a system view 100 of one or more users 104A-N carrying one or more user devices 106A-N that have a security control tool 108 that applies location based security controls within an area 102A according to an embodiment herein. A radius, as shown in FIG. 1, may define the area 102A (i.e. boundary). The area may be defined in other ways by enterprise perimeter 102B, outside of the boundary 102C, distance, and may encompass different geometries. The enterprise perimeter 102B is a measurement of the distance around the enterprise. The outside of the boundary 102C is an outer area of the radius of the area 102A. The security control tool 108 may communicate with a server 110 through a network 112. The security control tool 108 may be installed in the one or more user devices 106A-N. Initially, a geo location (i.e. latitude and longitude) of the area (e.g. perimeter of the enterprise 102B) may be defined at the server 110.

Further, the radius of the area 102A where security policies are effective may be defined at the server 110. In one embodiment, a white list of allowable applications and websites (e.g., search engines, work related websites) are defined at the server 110 for the one or more users 104A-N to access. In another embodiment, blacklisted applications and/or websites may be defined at the server 110 which are restricted for access by the one or more users 104A-N. The security policies may be applied on the one or more user devices 106A-N. In one embodiment, the security policies are applied on specific users and their devices. The security policies are accessed on the one or more user devices 106A-N from the server 110 via the network 112 when the one or more users 104A-N enters the area 102A.

The server 110 blocks the blacklisted or not white listed applications and websites on the one or more user devices 106A-N via the network 112 when the one or more users 104A-N are entered within the area 102A. In one embodiment, a camera of the one or more user devices 106A-N is controlled from the server 110 to disable it from capturing images in certain locations or of certain objects within the area 102A. The security control tool 108 also tracks an attendance of the one or more users 104A-N of the enterprise (e.g., the area). When the one or users 104A-N enters into the radius of the area 102A, a pop-up is used to provide biometric information to verify that the one or more user devices 106A-N are being used only by authorized users 104A-N.

The biometric information may used to take and update the attendance of the one or more users 104A-N. In one embodiment, the network 112 may be a wireless network, a LAN, and a WAN. The one or more user devices 106A-N may be a computer, a mobile phone, a tablet, a music player, and/or a smartphone. In one embodiment, the system 100 may be implemented as a SaaS (Software as a Service) based solution. In one embodiment, the area may be an educational institution, an enterprise, etc.

Figure 2:
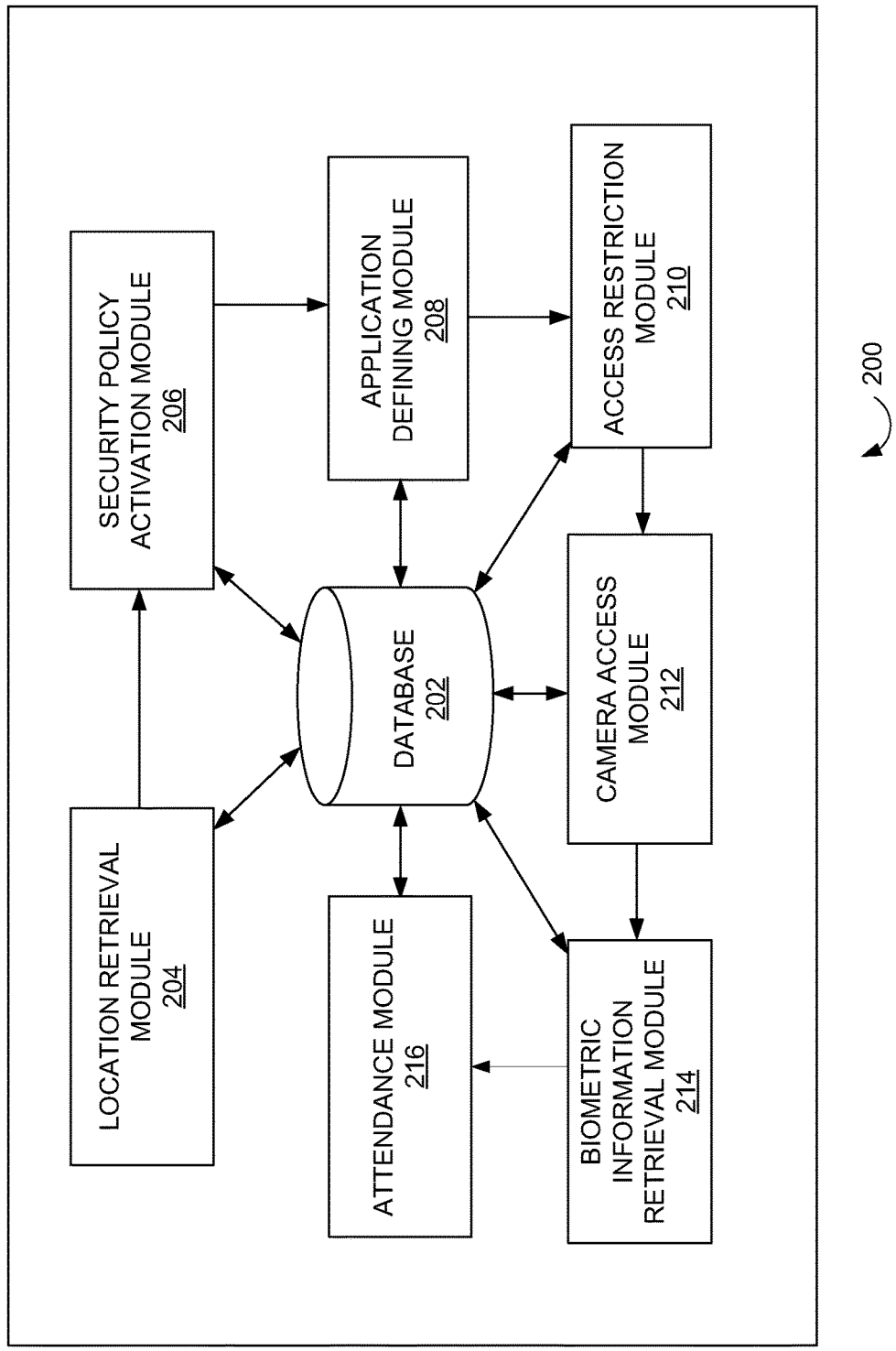
FIG. 2 illustrates an exploded view of the security control tool of FIG. 1 according to an embodiment herein.

FIG. 2 illustrates an exploded view 200 of the security control tool 108 of FIG. 1 according to an embodiment herein. The exploded view 200 includes a database 202, a location retrieval module 204, a security policy activation module 206, an application defining module 208, an access restriction module 210, a camera access module 212, a biometric information retrieval module 214, and an attendance module 216. The database 202 may store application and websites data which are blacklisted and/or white listed, biometric data of the one or more users 104A-N, data of the location of the area (enterprise), image category data, simulation, emulation and/or prototype data. The location retrieval module 204 retrieves a current location of the one or more users 104A-N. In one embodiment, the current location of the one or more users 104A-N is retrieved by the server 110 using GPS technology.

The security policy activation module 206 activates security policies on the one or more user devices 106A-N when the one or more users 104A-N enters within the radius of the area 102A from the outside of the boundary 102C. In one embodiment, the radius of the area 102 is already defined in the server 110. The application defining module 208 includes a white listed application defining module, and a black listed application defining module. The white listed application defining module is configured to allow an administrator to define the white listed applications and websites at the server 110. The blacklisted application defining module is configured to allow the administrator to define the blacklisted applications and websites at the server 110 to restrict accessing by the plurality of users 104A-N. The access restriction module 208 restricts the blacklisted applications and websites or not white listed applications to be accessed on the one or more user devices 106A-N when the one or more users 104A-N enters into the area 102A. The camera access module 210 is configured to access the camera of the one or more user devices 106A-N and control it from the server 110. In one embodiment, the camera of the one or more user devices 106A-N is accessed from the server 110 based on an image processing unit that authorizes picture taking based on the type of object that the camera points at.

The biometric information retrieval module 212 is configured to retrieve the biometric information of the one or more users 104A-N that are popped up to ensure the one or more user devices 106A-N are being used only by authorized users 104A-N. An attendance of the one or more users 104A-N is tracked when the one or more users 104A-N enters within the radius of the area 102A based on the biometric information of the one or more users 104A-N using the attendance module 214.

Figure 3A:
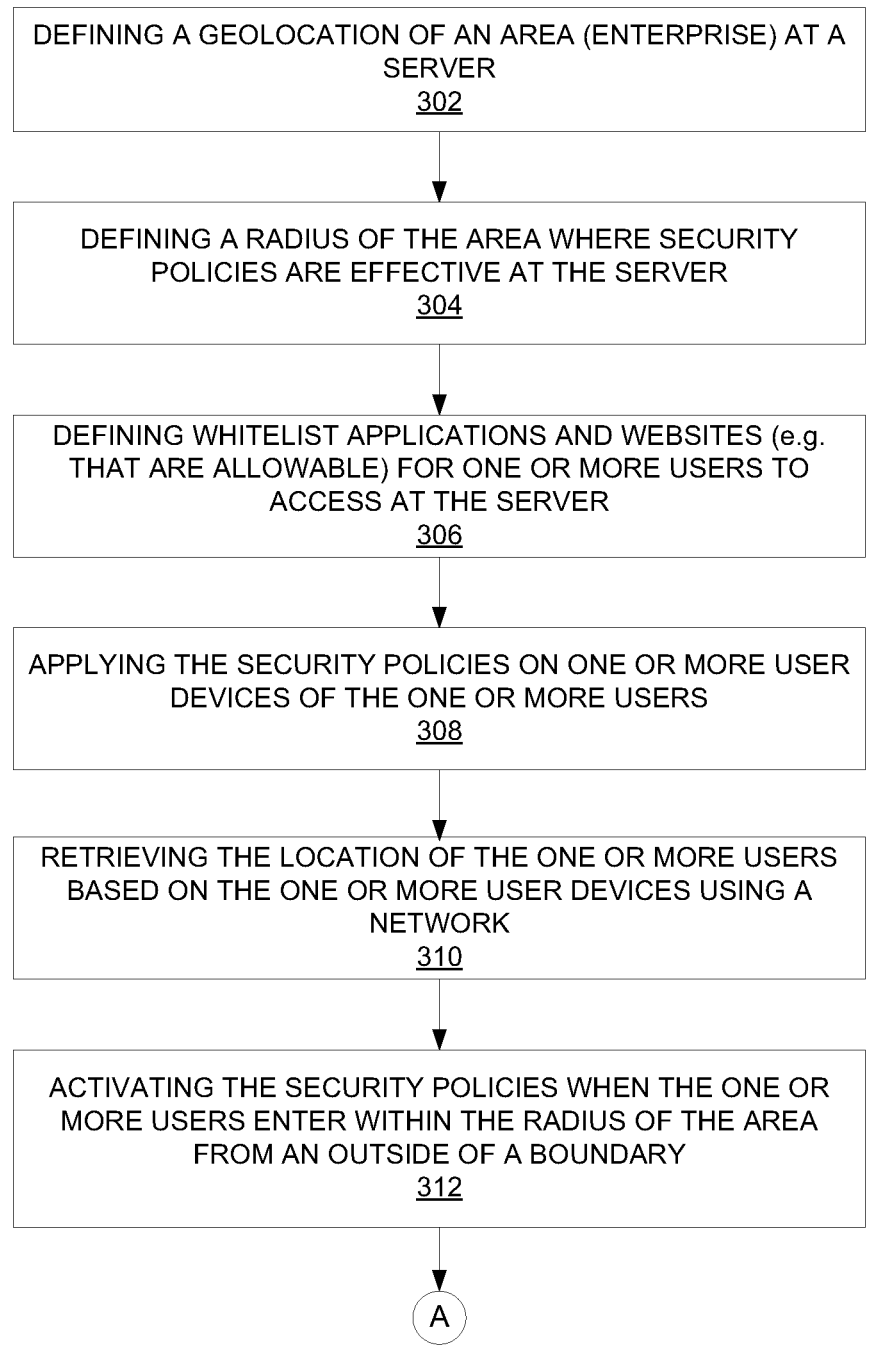
FIGS. 3A-3B are flow diagrams illustrating a method of providing location based security controls within an area according to an embodiment herein.
Figure 3B:
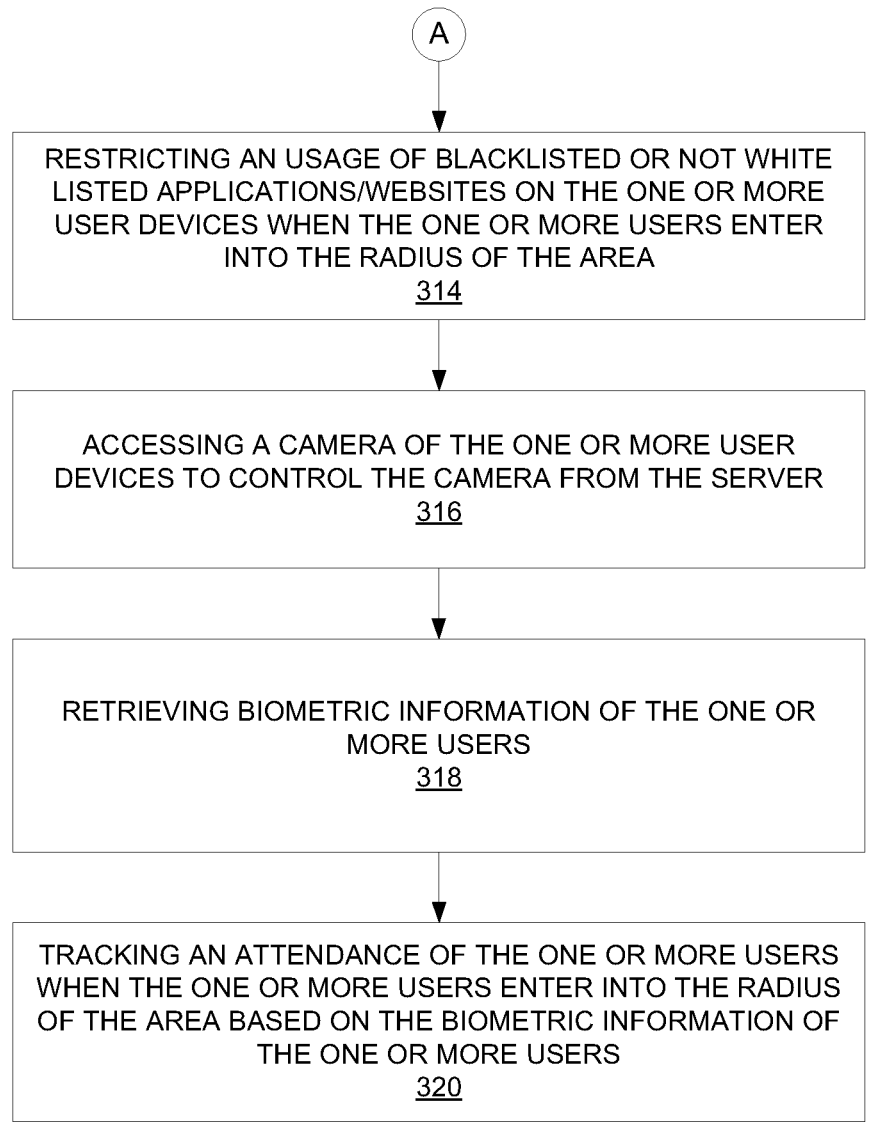

FIGS. 3A-3B are flow diagrams illustrating a method of providing location based security controls within an area (e.g., the area 102A of FIG. 1) according to an embodiment herein. At step 302, a geo location of an area (i.e. enterprise) is defined at a server 110. At step 304, a radius of the area (e.g. the enterprise) location where the security policies are effective is defined at the server 110. At Step 306, white listed applications and websites (e.g. that are allowable) are defined for the one or more users 104A-N to access at the server 110. At step 308, the security policies are applied on the one or more devices 106A-N of the users 104A-N. At step 310, the location of the one or more users 104A-N are retrieved based on the one or more user devices 106A-N using a network 112.

At step 312, the security policies are activated when the one or more users 104A-N enter within the radius of the area (e.g. the enterprise) 102A from an outside of a boundary. At step 314, a usage of black listed or not white listed applications/websites on the one or more user devices 106A-N are restricted when the one or more users 104A-N enter into the radius of the area 102A. At step 316, a camera of the one or more user devices 106A-N is accessed to control the camera from the server 110 when the one or more users enter within the radius of the area 102A. At step 318, biometric information of the one or more users is retrieved. The retrieved biometric information is popped up to ensure that the one or more user devices 106A-N is being used only by the authorized users 104A-N when the one or more users 104A-N enter into the radius of the area 102A. At step 320, an attendance of the one or more users 104A-N is tracked when the one or more users 104A-N enter into the radius of the area 102A based on the biometric information of the one or more users 104A-N.

Figure 4:
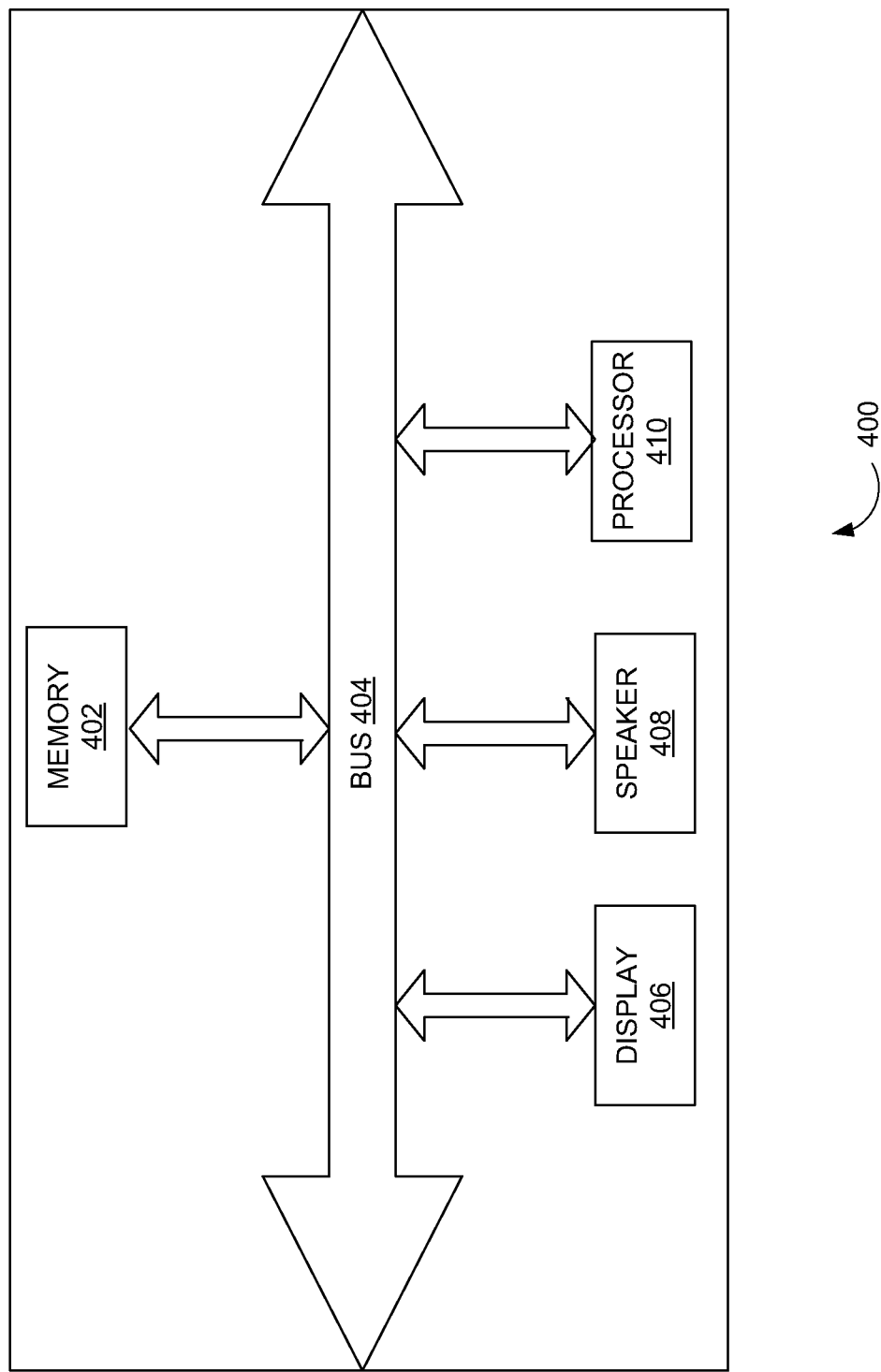
FIG. 4 illustrates an exploded view of the one or more user devices of FIG. 1 according to an embodiment herein.

FIG. 4 illustrates an exploded view 400 of the one or more user devices 106A-N of FIG. 1 having a memory 402 having a set of instructions, a bus 404, a display 406, a speaker 408, and a processor 410 capable of processing the set of instructions to perform any one or more of the methodologies herein, according to an embodiment herein. The processor 410 may also enable digital content to be consumed in the form of video for output via one or more displays 406 or audio for output via speaker and/or earphones 408. The processor 410 may also carry out the methods described herein and in accordance with the embodiments herein.

Digital content may also be stored in the memory 402 for future processing or consumption. The memory 402 may also store program specific information and/or service information (PSI/SI), including information about digital content (e.g., the detected information bits) available in the future or stored from the past. A user of the receiver 400 may view this stored information on display 406 and select an item of for viewing, listening, or other uses via input, which may take the form of keypad, scroll, or other input device(s) or combinations thereof. When digital content is selected, the processor 410 may pass information. The content and PSI/SI may be passed among functions within the receiver 400 using the bus 404.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
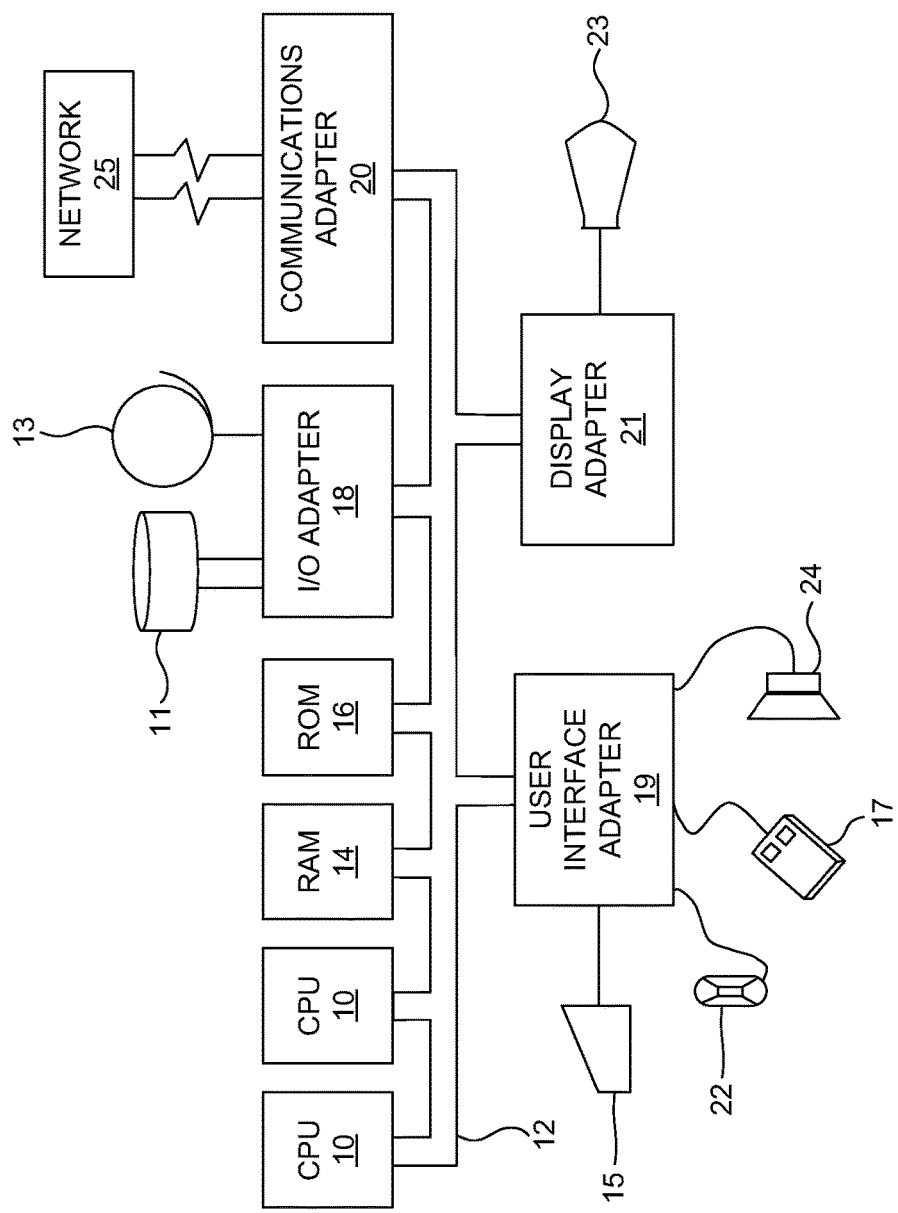
FIG. 5 illustrates a schematic diagram of a computer architecture in accordance with the embodiments herein.

A representative hardware environment for practicing the embodiments herein is depicted in FIG. 5. This schematic drawing illustrates a hardware configuration of a computer architecture/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The security control tool 108 is used to provide security for the area (e.g. enterprises) to ensure that the security controls are implemented on the one or user devices 106A-N. The security control tool 108 is used to provide the security for the defined area. The attendance of the one or more users 104A-N is tracked using the system without the need of any physical device. The enterprise can be assured that the one or more user devices 106A-N is not used for data leakage. The enterprise is also able to control usage of the applications of the one or more users 104A-N within the radius of the enterprise 102A and thus improving overall productivity.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A computer implemented method for providing location based security controls on a plurality of user devices, said method comprising:
defining a geo location of an area at a server;
defining a radius of said area where security policies are effective at said server;
retrieving a current location of a plurality of users;
activating said security policies on said plurality of user devices from said server when said plurality of users enter within said radius of said area from an outside of a boundary;
restricting blacklisted applications and websites or not white listed applications to be accessed on said plurality of user devices upon said plurality of users enter into said radius of said area;
accessing a camera of said plurality of user devices to control said camera from said server when said plurality of users enter within said defined radius of said area, wherein said camera is accessed, from said server, using an image processing unit that authorizes images that are captured based on a type of object that said camera points at;
disabling, from said server, said camera from capturing said images based on characteristics of said images in at least one of (a) said defined radius of said area or (b) a sub-area of said defined radius of said area:
retrieving biometric information of said plurality of users;
tracking an attendance of said plurality of users when said plurality of users enter within said radius of said area based on said biometric information of said plurality of users; and
wherein when said plurality of users enter into said defined radius of said area, said biometric information is displayed as a message to verify that said plurality of user devices are being used only by authorized users.

2. The computer implemented method of claim 1, wherein said camera is disabled from capturing said images based on at least one of a location of said plurality of user devices in said defined radius of said area or a location of said plurality of user devices in said sub-area of said defined radius of said area.

3. The computer implemented method of claim 1, further comprising the step of defining said white listed of allowable applications and websites at said server for said plurality of users to access.

4. The computer implemented method of claim 1, further comprising the step of defining said blacklisted applications and websites at said server which are restricted for access by said plurality of users.

5. The computer implemented method of claim 1, further comprising applying said security policies on said plurality of user devices.

6. A non-transitory program storage device readable by a computer, and comprising a program of instructions executable by said computer to perform a method for providing location based security controls on a plurality of user devices, said method comprising:
defining a geo location of an area at a server;
defining a radius of said area where security policies are effective at said server;
retrieving a current location of a plurality of users;
activating security policies on said plurality of user devices from said server when said plurality of users enter within said radius of said area from an outside of a boundary;
restricting blacklisted applications and websites or not white listed applications to be accessed on said plurality of user devices upon plurality of users enter into said radius of said area;
accessing a camera of said plurality of user devices to control said camera from said server when said plurality of users enter within said defined radius of said area, wherein said camera is accessed, from said server, using an image processing unit that authorizes images that are captured based on a type of object that said camera points at;
disabling, from said server, said camera from capturing said images based on characteristics of said images in at least one of (a) said defined radius of said area or (b) a sub-area of said defined radius of said area:
retrieving biometric information of said plurality of users; and
tracking an attendance of said plurality of users when said plurality of users enter within said radius of said area based on said biometric information of said plurality of users; and
wherein when said plurality of users enter into said defined radius of said area, said biometric information is displayed as a message to verify that said plurality of user devices are being used only by authorized users.

7. The non-transitory machine-readable medium of claim 6, wherein said camera is disabled from capturing said images based on at least one of a location of said plurality of user devices in said defined radius of said area or a location of said plurality of user devices in said sub-area of said defined radius of said area.

8. The non-transitory machine-readable medium of claim 6, further comprising the step of defining said white listed of allowable applications and websites at said server for said plurality of users to access.

9. The non-transitory machine-readable medium of claim 6, further comprising the step of defining said blacklisted applications and websites at said server which are restricted for access by said plurality of users.

10. The non-transitory machine-readable medium of claim 6, further comprising the step of applying said security policies on said plurality of user devices.

11. A system for providing location based security controls on a plurality of user devices, said system comprising:
a memory that stores a database and a set of modules; and
a processor that executes said set of modules, wherein said set of modules comprise:
a location retrieval module, executed by said processor, configured to retrieve a current location of a plurality of users;
a security policy activation module, executed by said processor, configured to activate security policies on said plurality of user devices when said plurality of users enter within a radius of an area from an outside of a boundary, wherein said outside of said boundary is an outer area of said radius of said area, wherein said radius of said area is defined at a server;
an access restriction module, executed by said processor, configured to restrict blacklisted applications and websites and/or not white listed applications to be accessed on said plurality of user devices upon plurality of users enter into said radius of said area;
a camera access module, executed by said processor, configured to access a camera of said plurality of user devices to control said camera from said server when said plurality of users enter within said defined radius of said area, wherein said camera is accessed, from said server, using an image processing unit that authorizes images that are captured based on a type of object that said camera points at, wherein said camera is disabled, from said server, from capturing said images based on (a) a location of said plurality of user devices in said defined radius of said area or a location of said plurality of user devices in a sub-area of said defined radius of said area and (b) characteristics of said images in at least one of (i) said defined radius of said area or (ii) said sub-area of said defined radius of said area:

a biometric information retrieval module, executed by said processor, configured to retrieve biometric information of said plurality of users, wherein when said plurality of users enter into said defined radius of said area, said biometric information is displayed as a message to verify that said plurality of user devices are being used only by authorized users; and an attendance module, executed by said processor, configured to track an attendance of said plurality of users when said plurality of users enter within said radius of said area based on said biometric information of said plurality of users.

12. The system of claim 11, further comprising an application defining module that comprises:
(a) a white listed application defining module, executed by said processor, configured to allow an administrator to define said white listed applications and web sites at said server; and
(b) a blacklisted application defining module, executed by said processor, configured to allow said administrator to define said blacklisted applications and websites at said server to restrict accessing by said plurality of users.

* * * * *